US010067218B2

(12) United States Patent
Alicot et al.

(10) Patent No.: US 10,067,218 B2
(45) Date of Patent: Sep. 4, 2018

(54) SYSTEMS AND METHODS FOR ESTIMATING A TAG'S LOCATION

(71) Applicants: Jorge F. Alicot, Davie, FL (US); Paul B. Rasband, Lantana, FL (US)

(72) Inventors: Jorge F. Alicot, Davie, FL (US); Paul B. Rasband, Lantana, FL (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 519 days.

(21) Appl. No.: 14/948,496

(22) Filed: Nov. 23, 2015

(65) Prior Publication Data

US 2017/0146636 A1 May 25, 2017

(51) Int. Cl.
   *G08B 13/14* (2006.01)
   *G01S 5/02* (2010.01)
   *G08B 13/24* (2006.01)
   *G01S 13/87* (2006.01)

(52) U.S. Cl.
   CPC ........ *G01S 5/0252* (2013.01); *G01S 5/0278* (2013.01); *G01S 13/878* (2013.01); *G08B 13/2462* (2013.01)

(58) Field of Classification Search
   CPC .......... G06K 2017/0045; G01S 5/0252; G01S 5/0278; G08B 13/2462
   See application file for complete search history.

(56) References Cited

U.S. PATENT DOCUMENTS

| 7,081,818 | B2 * | 7/2006 | Eckstein | G06K 7/0008 340/13.26 |
| 8,325,019 | B2 * | 12/2012 | Liu | G01S 11/06 340/10.1 |
| 8,988,195 | B2 * | 3/2015 | Joshi | G01S 5/0289 340/10.2 |
| 2008/0111690 | A1 * | 5/2008 | Dupler | G06Q 10/087 340/572.1 |
| 2016/0180673 | A1 * | 6/2016 | Hoehn | G08B 13/2462 340/572.8 |

\* cited by examiner

*Primary Examiner* — Phung Nguyen
(74) *Attorney, Agent, or Firm* — Fox Rothschild LLP; Robert J. Sacco; Carol E. Thorstad-Forsyth

(57) ABSTRACT

Systems (100) and methods for determining a location of a tag (310). The methods involve: receiving, at each detector of a plurality of detectors (202-216, 306, 308), a device transmission periodically transmitted from the tag; determining, by the detectors, Received Signal Strength Indictors ("RSSIs") for the device transmission received thereat; determining, by a computing device (218), a probable location of the tag within the passage, first demarcated area or second demarcated area using the RSSIs and relationships between the RSSIs; determining a first likelihood value indicating the likelihood that the probable location is correct; and determining an estimated location of the tag within the passage, first demarcated area or second demarcated area based on the probable location when the first likelihood value meets a first criteria.

12 Claims, 5 Drawing Sheets

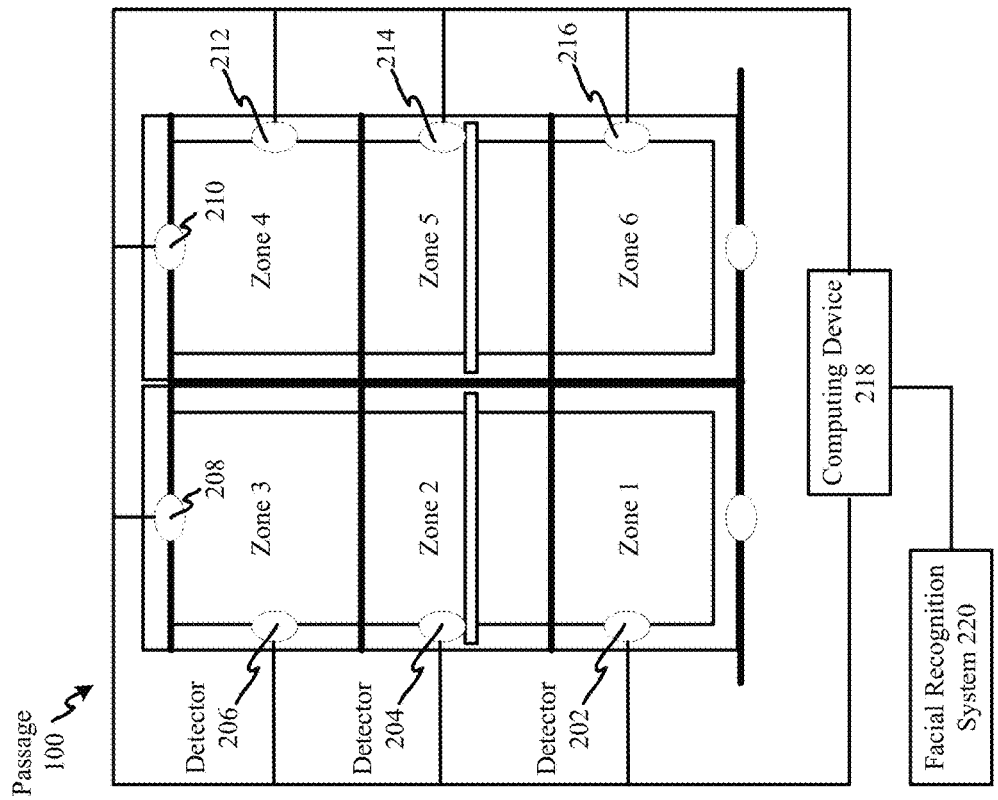
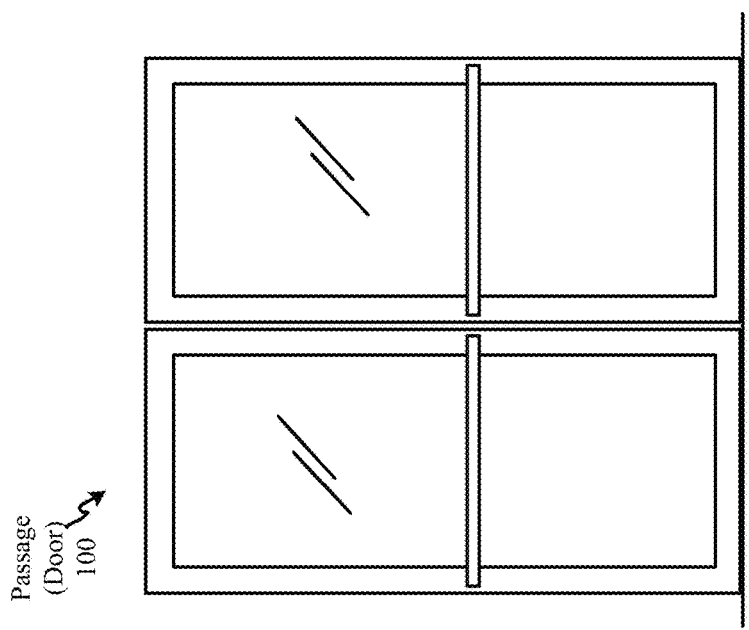
FIG. 1
FIG. 2

2

SYSTEMS AND METHODS FOR ESTIMATING A TAG'S LOCATION

FIELD OF THE INVENTION

This document relates generally to wireless based systems. More particularly, this document relates to systems and methods for determining Received Signal Strength Indicator ("RSSI") based location profiles of tags.

BACKGROUND OF THE INVENTION

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store ("the interrogation zone"). The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of EAS security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

There are many known algorithms for determining the distance between a tag and another device or object (e.g., a tag reader or an EAS system pedestal defining an interrogation). One such algorithm is based on Received Signal Strength Indicator ("RSSI") information. This RSSI based algorithm is hindered by the uncertainty of factors affecting the received signal strength such as loading of the antenna and the spatial orientation of one antenna to another antenna. In a passage system, it is desirable to quickly identify the presence of an EAS device containing an identification code within the interrogation zone. However, the scattering of Radio Frequency ("RF") signals, loading effects, and spatial relation of one antenna to another introduces uncertainties as to the true location of the device.

SUMMARY OF THE INVENTION

The present disclosure concerns implementing systems and methods for determining a location of a tag. The methods involve receiving, at each detector of at least one of a plurality of first detectors and a plurality of second detectors, a device transmission periodically transmitted from the tag. The plurality of first detectors is disposed in proximity to a passage at which a person can transition from a first demarcated area to a second demarcated area. The plurality of second detectors is disposed within the first and second demarcated areas. The passage is sub-divided into a plurality of zones.

Next, the plurality of first detectors and/or the plurality of second detectors determine Received Signal Strength Indictors ("RSSIs") for the device transmission received thereat. The RSSIs and the relationships therebetween are used to determine a probable location of the tag within the passage, first demarcated area or second demarcated area. A first likelihood value is determined that indicates the likelihood that the probable location is correct. An estimated location of the tag within the passage, first demarcated area or second demarcated area is then determined based on the probable location when the first likelihood value meets a first criteria.

The estimated location comprises a zone selected from the plurality of zones where the device transmission originated. The zone is selected based on relational RSSI ratios computed using the RSSIs determined by the plurality of first detectors.

DESCRIPTION OF THE DRAWINGS

Embodiments will be described with reference to the following drawing figures, in which like numerals represent like items throughout the figures, and in which:

FIG. 1 is an illustration of an exemplary passage that is useful for understanding the present invention.

FIG. 2 is an illustration of an exemplary passage having a plurality of detectors disposed on or adjacent thereto.

DETAILED DESCRIPTION OF THE INVENTION

Figure 3:
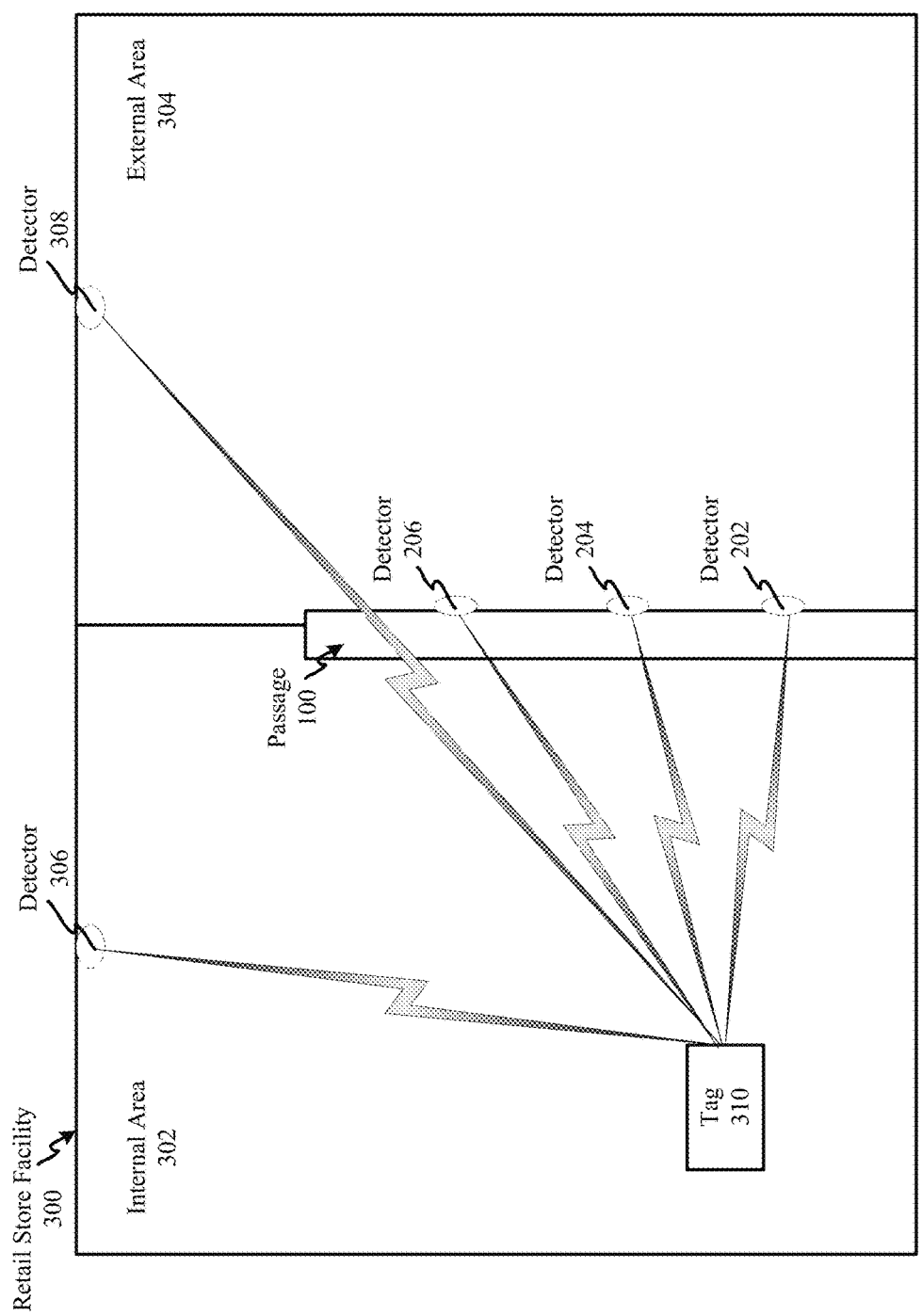
FIG. 3 is an illustration of an exemplary retail store facility in which the passage of FIGS. 1-2 is employed.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In the present disclosure, there are described systems and methods for improving detection accuracy with Received Signal Strength Indicator ("RSSI"). The methods involve estimating a tag's position by combining multiple received RSSI signals. Each RSSI signal may be received from a tag or other transmitting device. Therefore, the transmission is referred to as a device transmission. The receiving device (e.g., an RFID reader) is referenced as a detector which could be an RFID antenna.

Referring now to FIGS. 1-2, there are provided schematic illustrations of an exemplary passage 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which objects, items or persons need to be located and/or tracked. The present invention can also be employed in any environment in which a person is to be provided restricted access to a given area.

The passage 100 comprises a point at which a person can transition from one area (e.g., an external area 304) to another area (an internal area 302). Each area comprises an open space that is virtually or physically demarcated. For example, the passage 100 allows a person to enter and exit a retail store facility 300. In this scenario, the passage 100 may include a door. The passage 100 is sub-divided into a plurality of zones 1-6. Six zones are shown in FIG. 2. The present invention is not limited in this regard. Any number of zones can be employed in accordance with a particular application (e.g., 2 zones, 4 zones or 10 zones). Each zone has one or more RSSI profiles associated therewith which were created for all or some of the possible orientations of the tag 310. Exemplary RSSI profiles will be discussed below in relation to TABLE 1.

Prior to discussing TABLE 1, it should be understood that at least one detector 202-216 is disposed on or adjacent to a portion of the passage 100 defining a respective zone 1, 2, 3, 4, 5 or 6. Each detector 202-216 is configured to transmit signals to and receive signals from tags 310 located in proximity thereto. In some scenarios, at least one tag comprises a Common Access Card ("CAC"), employee badge, security tag, a cellular phone, an ID beacon or other signal transmitting device. The tags 310 include, but are not limited to, RFID enabled tags or Bluetooth enabled tags having dipole antennas. Accordingly, each detector includes, but is not limited to, an RFID reader, an RF beacon, or a Bluetooth enabled device.

During operation, the tag 310 periodically transmits a wireless signal (or device transmission) which is received by all or some of the detectors 202-216. The periodic transmissions can be performed in response to an interrogation signal received at the tag or alternatively automatically in accordance with pre-defined timing criteria. The RSSI for each received wireless signal is determined by the respective detector. Thereafter, the relationship of the RSSIs is used by a computing device 218 in a subsequent process to estimate a location of the tag 310. More specifically, the computing device 218 determines: (1) whether the tag 310 is located in a passage 100; (2) in which zone 1, 2, 3, 4, 5 or 6 of the passage 100 is the tag located; (3) whether the tag 310 is located inside or outside of the retail store facility 300; and/or (4) in which internal (or inside) area 302 or external (or outside) area 304 is the tag 310 located.

Only one internal area and only one external area are shown in FIG. 3. The present invention is not limited in this regard. For example, a plurality of detectors can be employed so as to facilitate the determination as to which one of a plurality of internal or external areas a given tag is located in.

Referring now to TABLE 1, a plurality of exemplary RSSI profiles are shown.

TABLE 1

| | | Zone 2-RSSI Profile-Vertical Tag Orientation | | Zone 2-RSSI Profile-Diagonal Right Tag Orientation | | Zone 3-RSSI Profile-Vertical Tag Orientation | | RSSI Profile-Distant Tag | |
|---|---|---|---|---|---|---|---|---|---|
| | | RSSI (dBm) | Ratio | RSSI (dBm) | Ratio | RSSI (dBm) | Ratio | RSSI (dbm) | Ratio |
| Detector Number | 202 | −60 | 0.66 | −74 | 0.00 | −85 | 0.00 | −75 | 0.67 |
| | 204 | −50 | 1.00 | −52 | 1.00 | −62 | 0.70 | −79 | 1.00 |
| | 206 | −60 | 0.66 | −57 | 0.77 | −52 | 1.00 | −81 | 0.67 |
| | 208 | −79 | 0.00 | −67 | 0.32 | −81 | 0.12 | −89 | 0.33 |
| Standard Deviation | | 12.12 | | 9.88 | | 15.64 | | 5.89 | |
| Range | | 29 | | 22 | | 33 | | 14 | |

As evident from TABLE 1, each zone is identified by the respective RSSI profile defined by characteristics of the wireless signal received at the detectors. For example, the RSSI values at the detectors are evaluated to determine the relationship therebetween. The term "RSSI value", as used herein, refers to the average of at least two samples collected over a (possibly very brief) period of time (e.g., 50 microseconds to perhaps 1 millisecond, roughly). The average may be over 2-4 samples or even dozens of samples in that time period. The idea is to average out random variation in the RF environment and small circuit noise in the device, without averaging over such a large period of time that the average starts to include RSSI differences due to changes in location of the tag itself. Based on the determined RSSI values and relationships therebetween, the computing device 218 can derive an estimate of a zone location where the wireless transmission originated. Additionally, the determined RSSI values can be correlated to the orientation of the tag.

In some scenarios, the RSSI values are normalized and used by the computing device 218 in a ratio or relational analysis. For example, TABLE 1 defines possible RSSI profile relations for detectors 202, 204, 206 and 208. When the tag 310 is in a zone, the RSSI values are captured and the relational RSSI ratios for the detectors are estimated. The relational RSSI ratios were computed in Excel as follows.

$$\text{Ratio} = (\text{RSSI}_X - \text{RSSI}_{smallest})/\text{Range}$$

where Ratio represents the relational RSSI ratio, $\text{RSSI}_X$ represents the RSSI value for the respective detector, $\text{RSSI}_{smallest}$ represents the smallest RSSI value of a set of RSSI values, and Range represents the range. As such, the relational RSSI ratios for "Zone 2-RSSI Profile-Vertical Orientation" are computed as follows: $((-60)-(-79))/29=0.66$; $((-50)-(-79))/29=1.00$; $((-60)-(-79))/29=0.66$; and $((-79)-(-79))/29=0.00$. Similarly, the ranges for "Zone 2-RSSI Profile-Diagonal Right Tag Orientation" are computed as follows: $((-74)-(-74))/22=0.00$; $((-52)-(-74))/22=1.00$; $((-57)-(-74))/22=0.77$; and $((-67)-(-74))/22=0.32$. The ranges for "Zone 3-RSSI Profile-Vertical Tag Orientation" are computed as follows: $((-85)-(-85))/33=0.00$; $((-62)-(-85))/33=0.70$; $((-52)-(-85))/33=1.00$; and $((-81)-(-85))/33=0.12$. The ranges for "RSSI Profile-Distant Tag" are computed in the same way. On a distant tag, differences in results among zones diminish as the distance increases. In other words, if the distant tag is 30 or 40 feet away, the ratios computed for zone 2 and 3 should start to look similar. This must be the case since, in the limit of very large distance, the distance between zones is negligible compared to the distance between the tag and any one zone. The zones become mathematically indistinct from one another for increasingly large tag separation.

TABLE 1 also includes possible detection profiles when the tag 310 is in a plurality of orientations. The RSSI value of one detector could provide an indication of tag rotation relative to the other detectors. Distant tags may also be discriminated based on standard deviation of the detected RSSI values. The standard deviation is quantitatively smaller for distant tags than for a tag in the passage 100. The standard deviation is computed in Excel as follows.

$$\text{SD} = \text{STDEV}(\text{RSSI}_{202}:\text{RSSI}_{208})$$

where SD represents the standard deviation, $\text{RSSI}_{202}$ represents the RSSI value for detector 202, and $\text{RSSI}_{208}$ represents the RSSI value for detector 208. In Excel, the STDEV function measures how widely values in a set differ from the average, or mean, value. The mathematical operations implemented by the STDEV function are outlined below for the "Zone 2-RSSI Profile-Vertical Orientation".

Calculate the average, or mean value=$(-60)+(-50)+(-60)+(-79)=-249/4=-62.25$

Calculate deviations of RSSI dBm data points from the average or mean value, square the results of each, and divide the results of each by (n−1), where n is the number of values.

$$((-60)-(-62.25))^2=(2.25)^2=5.0625/3=1.69$$

$$(-50--62.25)^2=(12.25)^2=150.0625/3=50.02$$

$$(-60--62.25)^2=(2.25)^2=5.0625/3=1/69$$

$$(-79--62.25)^2=(-16.75)^2=280.5625/3=93.52$$

Take the square root of the sum of the results to obtain the standard-deviation.

$$\sqrt{(1.69+50.02+1.69+93.52)}=\sqrt{146.92}=12.12$$

The standard deviations for the other RSSI profiles of TABLE 1 can be computed in a similar manner.

The range values of TABLE 1 can be computed as follows in Excel.

$$\text{Range}=\text{MAX}(\text{RSSI}_{202}:\text{RSSI}_{208})-\text{MIN}(\text{RSSI}_{202}:\text{RSSI}_{208})$$

where Range represents the range value, $\text{RSSI}_{202}$ represents the RSSI value for detector 202, and $\text{RSSI}_{208}$ represents the RSSI value for detector 208. In Excel, the MAX function finds the maximum value in a range of cells. The MIN function finds the minimum value in a range of cells. Accordingly, the range for "Zone 2-RSSI Profile-Vertical Orientation" is computed as follows: $-79--50=29$. Similarly, the range for "Zone 2-RSSI Profile, Diagonal Right Tag Orientation" is computed as follows: $-74--52=22$. The range for "Zone 3-RSSI Profile-Vertical Tag Orientation" is computed as follows: $-85--52=33$. The range for "RSSI Profile-Distant Tag" is computed as follows: $-89--75=14$.

In some scenarios specified in TABLE 1, a tag 310 transmits a wireless signal that is received by detectors 202, 204, 206 and 208. The detectors respectively process the received signals to determine the RSSI values thereof. The RSSI values are then used to determine a probability that the tag 310 is located within one of the zones 1-6. For example, if the RSSI values associated with detector 202 is −60 dBm, detector 204 is −50 dBm, detector 206 is −60 dBm and detector 208 is −79 dBm, then a determination is made that the tag 310 has a vertical tag orientation and is probably located in zone 2 of the passage 100. Additionally or alternatively, if a standard deviation of the RSSI values is approximately 12.12 and/or range is approximately 29, then a determination is made that the tag 310 has a vertical tag orientation and is probably located in zone 2 of the passage 100. In contrast, if the RSSI values associated with detector 202 is −75 dBm, detector 204 is −79 dBm, detector 206 is −81 dBm and detector 208 is −89 dBm, then a determination is made that the tag 310 is probably not located in any of the zones 1-6 because it is located relatively far from the passage 100 (e.g., in an external area 304). Additionally or alternatively, if a standard deviation of the RSSI values is approximately 5.89 and/or range is approximately 14, then a determination is made that the tag 310 is probably not located in any of the zones 1-6 because it is located relatively far from the passage 100 (e.g., in an external area 304).

Notably, the technique employed herein to define a tracking and detection architecture uses the combination of passage and area information for determining an outcome of detection in the passage 100. The outcome of passage and area likelihood outcomes are communicated to a decision engine of the computing device 218 based on well-known statistical detection concepts. A schematic illustration is provided in FIG. 4 that is useful for understanding how the decision engine derives its output in some scenarios.

Figure 4:
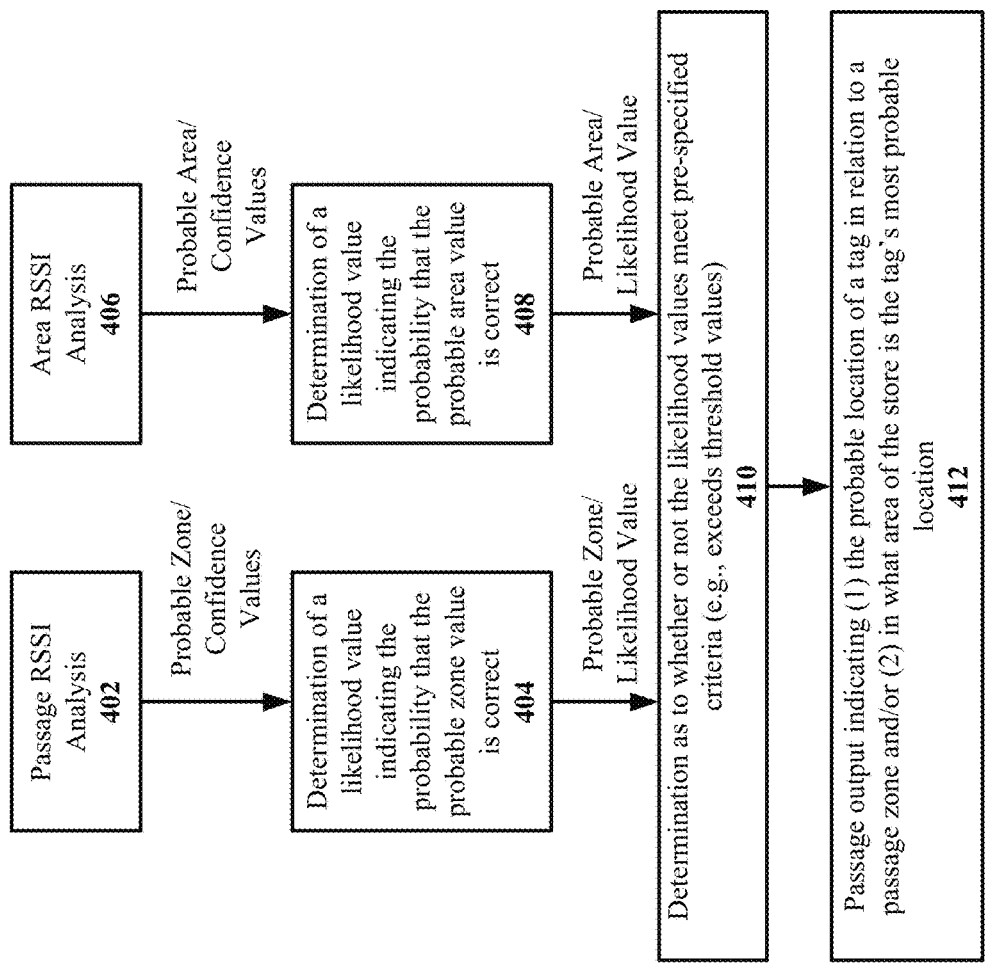
FIG. 4 is a functional block diagram of the passage algorithm employed by the computing device of FIG. 2.

As shown in FIG. 4, the passage algorithm employed by the computing device 218 comprises the performance of a plurality of operations. The operations include passage RSSI based operations. The inputs for the passage algorithm are provided by the detectors 202-216 disposed on or adjacent to the passage 100 and zones 1-6. For example, RSSIs of wireless signals transmitted from the tag 310 and received at the detectors 202-216 are provided to the computing device 218 for use in the previously listed operations.

The passage RSSI operations begin with functional block 402 in which RSSI values are processed to identify a possible zone that the tag 310 is located in, as well as determine a confidence value for the probable zone. The zone predication is made using RSSI profiles as described above in relation to TABLE 1. The confidence value is determined by the difference between the measured statistical data and the expected statistical data for a zone. The degree to which the expected and measured statistical data match would define the confidence or likelihood of a correct decision.

The outputs of functional block 402 are passed to functional block 403. In functional block 403, a likelihood value is determined. The likelihood value indicates the probability that the probable zone value is correct. The probable zone and likelihood value are than passed to functional block 410. In functional block 410, a determination is made as to whether or not the likelihood value meets a pre-specified criteria (e.g., exceeds a threshold value). If the likelihood value meets the pre-specified criteria, then the probable area is passed to functional block 412, which will be described below.

As also shown by FIG. 4, the area algorithm employed by the computing device 218 comprises the performance of a plurality of operations. The operations include passage RSSI based operations. The inputs for the area algorithm are provided by the detectors 306 disposed in internal areas 302 of the retail store facility 300 and detectors 308 disposed in areas 304 external to the retail store facility 300. For example, RSSIs of wireless signals transmitted from the tag 310 and received at the detectors 306, 308 are provided to the computing device 218 for use in the previously listed operations.

The passage RSSI based operations are performed in functional block 406. The operations of functional block 406 is the same as or similar to those performed in functional blocks 402. As such, the description provided above in relation to functional block 402 is sufficient for understanding the operations performed in functional blocks 406.

The outputs of functional block 406 are passed to functional block 408. In functional block 408, a likelihood value is determined. The likelihood value indicates the probability that the probable area value is correct. The probable area and likelihood value are than passed to functional block 410. In functional block 410, a determination is made as to whether or not the likelihood value meets a pre-specified criteria (e.g., exceeds a threshold value). If the likelihood value meets the pre-specified criteria, then the probable area is passed to functional block 412 for use in generating an estimated area output. The output of functional block 412 indicates (1) the probable location of the tag 310 in relation to a passage zone, and/or (2) in what area of the store is the tag's most probable location.

Figure 5:
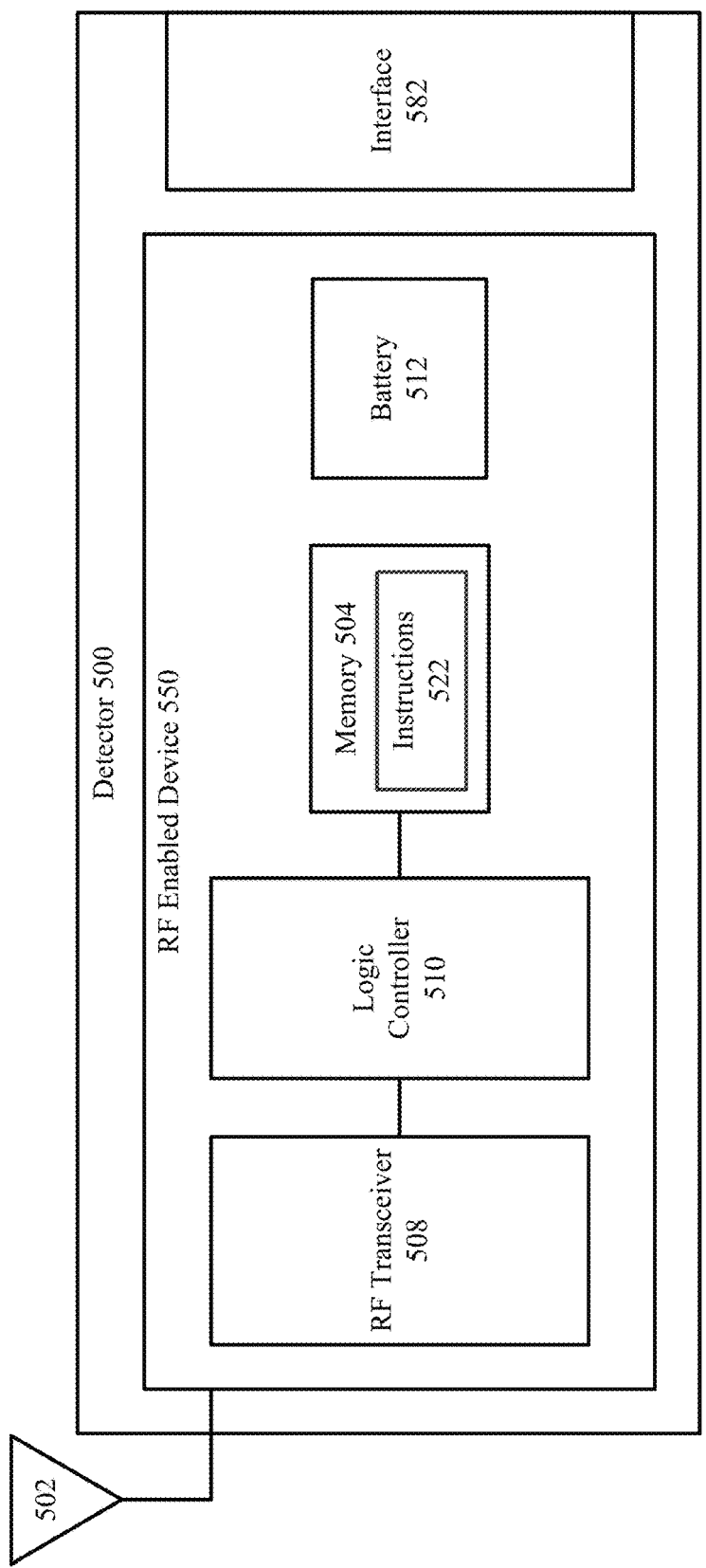
FIG. 5 is a block diagram of an exemplary architecture for a detector.

Referring now to FIG. 5, there is provided a block diagram of an exemplary architecture for a detector 500. Detectors 202-216, 306 and 308 are the same as or similar to the detector 500. As such, the discussion of detector 500 is sufficient for understanding detectors 202-216, 306 and 308.

Detector 500 may include more or less components that that shown in FIG. 5. However, the components shown are sufficient to disclose an illustrative embodiment implementing the present invention. Some or all of the components of the detector 500 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 5 represents an embodiment of a representative detector 500 configured to facilitate improved tag location estimations. In this regard, the detector 500 comprises an RF enabled device 550 for allowing data to be exchanged with an external device (e.g., tag 310 of FIG. 1) via RF technology. The components 504-516 shown in FIG. 5 may be collectively referred to herein as the RF enabled device 550, and include a power source 512 (e.g., a battery).

The RF enabled device 550 comprises an antenna 502 for allowing data to be exchanged with the external device via RF technology (e.g., RFID technology or other RF based technology). The external device may comprise a tag 310 of FIG. 3. In the case that the tag 310 is an RFID tag, the antenna 302 is configured to transmit RF carrier signals (e.g., interrogation signals) to the tag 310, and/or receive data response signals (e.g., authentication reply signals) generated by the tag 310. In this regard, the RF enabled device 550 comprises an RF transceiver 508. RFID transceivers are well known in the art, and therefore will not be described herein. However, it should be understood that the RF transceiver 508 receives RF signals including information from the transmitting device, and forwards the same to a logic controller 510 for extracting the information therefrom.

Notably, memory 504 may be a volatile memory and/or a non-volatile memory. For example, the memory 504 can include, but is not limited to, a Random Access Memory ("RAM"), a Dynamic Random Access Memory ("DRAM"), a Static Random Access Memory ("SRAM"), a Read-Only Memory ("ROM") and/or a flash memory. The memory 504 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 522 are stored in memory for execution by the RF enabled device 550 and that cause the RF enabled device 550 to perform any one or more of the methodologies of the present disclosure. The instructions 522 are generally operative to facilitate determinations as to where tags are located within a facility, passage or external area. Other functions of the RF enabled device 550 should be apparent from the above discussion.

It should also be noted that the system shown in FIG. 5 can incorporate Wake-On-Radio ("WOR") enabled transceiver technology. In this case, large parts of the transceiver 508 and logic controller 510 may be generally placed in deep sleep mode to conserve power. When the transceiver receives an approaching tag, or alternatively a wake-up message from another motion sensing device in the area equipped with a compatible transceiver, the detector components (508 and 510 specifically) transition to full power mode for execution of the location determining processes described herein.

Note that in some cases, the battery 512 may be replaced with a power supply which is connected to mains power or interface 582 (e.g., power over Ethernet), or in some cases may even be replaced with energy harvesting circuitry including a transducer and charge storage, such as a super-capacitor.

Figure 6:
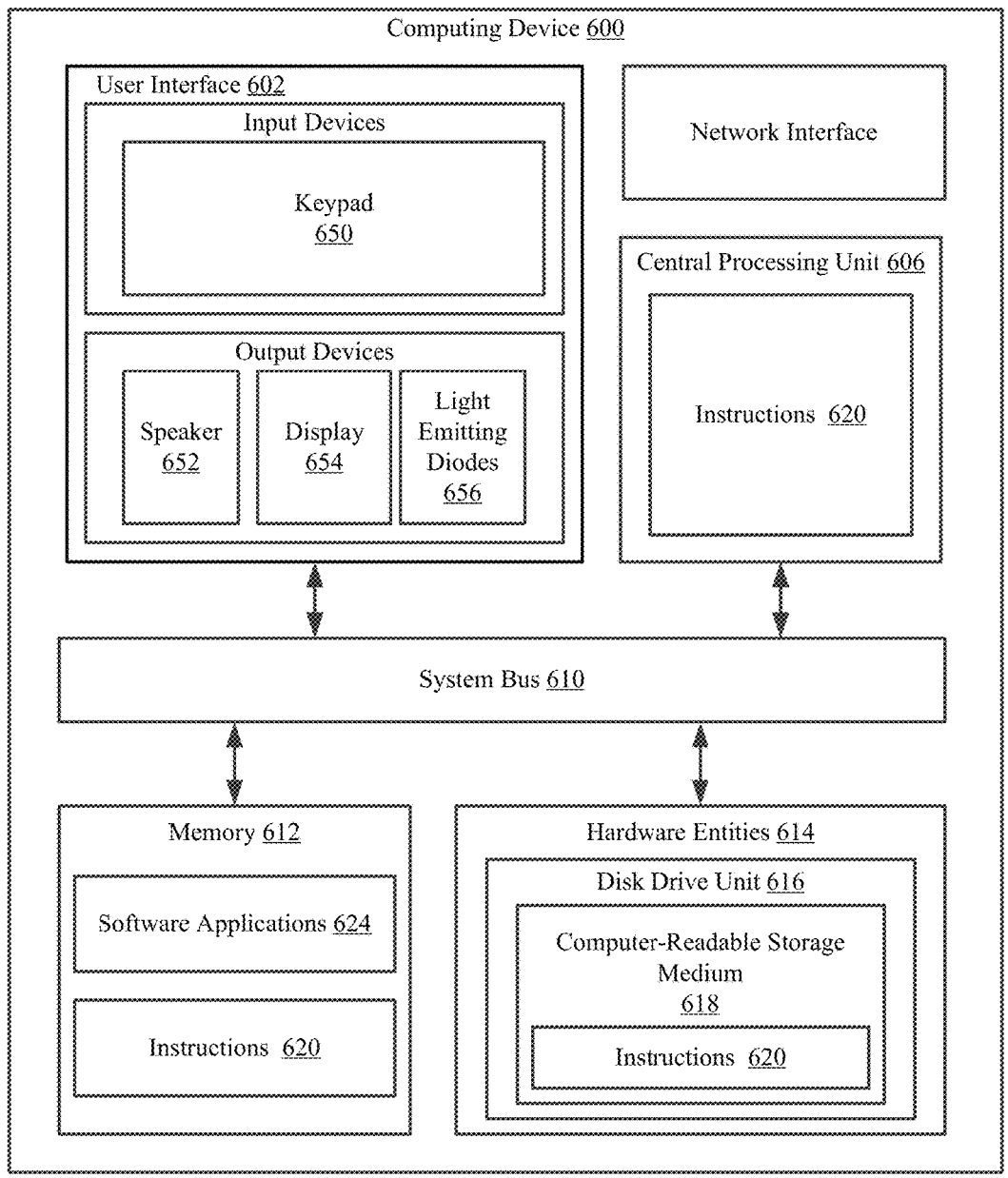
FIG. 6 is a block diagram of an exemplary architecture for a computing device.

Referring now to FIG. 6, there is provided a detailed block diagram of an exemplary architecture for a computing device 600. Computing device 218 of FIG. 2 is the same as or substantially similar to computing device 600. As such, the following discussion of computing device 600 is sufficient for understanding computing device 218.

Notably, the computing device 600 may include more or less components than those shown in FIG. 6. However, the components shown are sufficient to disclose an illustrative embodiment implementing the present invention. The hardware architecture of FIG. 6 represents one embodiment of a representative computer device configured to facilitate (a) the determination of locations of tags within a facility, passage or external area and/or (b) the provision of a three dimensional map showing the location of a tag. As such, the computing device 600 of FIG. 6 implements at least a portion of a method for providing such tag locations in accordance with embodiments of the present invention.

Some or all the components of the computing device 600 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 6, the computing device 600 comprises a user interface 602, a Central Processing Unit ("CPU") 606, a system bus 610, a memory 612 connected to and accessible by other portions of computing device 600 through system bus 610, and hardware entities 614 connected to system bus 610. The user interface can include input devices (e.g., a keypad 650) and output devices (e.g., speaker 652, a display 654, and/or light emitting diodes 656), which facilitate user-software interactions for controlling operations of the computing device 600. Also, maps may be presented to the user of the computing device 600 via the display 654. The maps may include a three dimensional map showing the estimated locations of the tags within a virtual area, and/or a heat map overlaid on an image inventory space showing the uncertainty of tag locations.

At least some of the hardware entities 614 perform actions involving access to and use of memory 612, which can be a Random Access Memory ("RAM"), a disk driver and/or a Compact Disc Read Only Memory ("CD-ROM"). Hardware entities 614 can include a disk drive unit 616 comprising a computer-readable storage medium 618 on which is stored one or more sets of instructions 620 (e.g., software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution by the computing device 600 and that cause the computing device 600 to perform any one or more of the methodologies of the present disclosure.

In some embodiments of the present invention, the hardware entities 614 include an electronic circuit (e.g., a processor) programmed for facilitating (a) determinations of locations of tags within a passage or area and/or (b) the provision of a three dimensional map showing locations of tags within the passage or area. In this regard, it should be understood that the electronic circuit can access and run software applications 624 installed on the computing device 600. The software application 624 is generally operative to facilitate: the determination of tag locations within a passage or area; and the mapping of the tag locations in a virtual three dimensional space. Other functions of the software application 624 should be apparent from the above discussion.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for determining a location of a tag, comprising:

receiving, at each detector of at least one of a plurality of first detectors and a plurality of second detectors, a device transmission periodically transmitted from the tag, where the plurality of first detectors are disposed in proximity to a passage at which a person can transition from a first demarcated area to a second demarcated area, the plurality of second detectors are disposed within the first and second demarcated areas, and the passage is sub-divided into a plurality of zones;

determining, by at least one of the plurality of first detectors and the plurality of second detectors, Received Signal Strength Indictors ("RSSIs") for the device transmission received thereat;

determining, by a computing device, a probable location of the tag within the passage, first demarcated area or second demarcated area using the RSSIs and relationships between the RSSIs;

determining a first likelihood value indicating a probability that the probable location is correct; and determining an estimated location of the tag within the passage, first demarcated area or second demarcated area based on the probable location when the first likelihood value meets a first criteria.

2. The method according to claim 1, wherein the estimated location comprises a zone selected from the plurality of zones where the device transmission originated.

3. The method according to claim 1, wherein a zone is selected based on relational RSSI ratios computed using the RSSIs determined by the plurality of first detectors.

4. The method according to claim 1, wherein the first likelihood value is determined based on a confidence value computed for the probable location.

5. The method according to claim 4, wherein the confidence value is computed based on a statistical analysis and RSSI ratio calculations for RSSI levels received by the plurality of first detectors.

6. The method according to claim 4, wherein the confidence value is assigned based on how well correlated measured statistical values are to reference statistical values.

7. A system, comprising:
a tag;
a plurality of first detectors and a plurality of second detectors, the plurality of first detectors disposed in proximity to a passage at which a person can transition from a first demarcated area to a second demarcated area, the plurality of second detectors disposed within the first and second demarcated areas, and the passage sub-divided into a plurality of zones, where each detector of the plurality of first and second detectors is configured to receive a device transmission periodically transmitted from the tag, and determine a Received Signal Strength Indictors ("RSSI") for the device transmission received thereat; and an electronic circuit communicatively coupled to the plurality of first and second detectors, and configured to determine a probable location of the tag within the passage, first demarcated area or second demarcated area using the RSSIs and relationships between the RSSIs, determine a first likelihood value indicating a probability that the probable location is correct, and determine an estimated location of the tag within the passage, first demarcated area or second demarcated area based on the probable location when the first likelihood value meets a first criteria.

8. The system according to claim 7, wherein the estimated location comprises a zone selected from the plurality of zones where the device transmission originated.

9. The system according to claim 7, wherein a zone is selected based on relational RSSI ratios computed using the RSSIs determined by the plurality of first detectors.

10. The system according to claim 7, wherein the first likelihood value is determined based on a confidence value computed for the probable location.

11. The system according to claim 10, wherein the confidence value is computed based on a statistical analysis and RSSI ratio calculations for RSSI levels received by the plurality of first detectors.

12. The system according to claim 10, wherein the confidence value is assigned based on how well correlated measured statistical values are to reference statistical values.

* * * * *